United States Patent [19]

Niskin

[11] Patent Number: 4,708,321
[45] Date of Patent: Nov. 24, 1987

[54] MULTIPLE SHEAVE ASSEMBLY WITH ANGLED ROLLERS

[76] Inventor: Shale J. Niskin, 3415 Chase Ave., Miami Beach, Fla. 33169

[21] Appl. No.: 870,924

[22] Filed: Jun. 5, 1986

[51] Int. Cl.⁴ .......................... B66D 1/36; B66D 3/06
[52] U.S. Cl. .................................. 254/397; 254/400; 254/403; 254/405; 254/415
[58] Field of Search ............... 254/393, 394, 395, 397, 254/400, 401, 403, 404, 407, 412, 902, 415

[56] References Cited

U.S. PATENT DOCUMENTS

| 656,949 | 8/1900 | Cruickshank et al. | 254/400 X |
| 1,712,478 | 5/1929 | Monroe | 254/394 |
| 2,770,499 | 11/1956 | Rapisarda | 254/397 X |
| 2,821,937 | 2/1958 | Madsen | 254/400 X |
| 3,042,374 | 7/1962 | Livingston | 254/394 X |
| 3,199,840 | 8/1965 | Lindsey | 254/401 |
| 4,042,216 | 8/1977 | Maraux | 254/395 |
| 4,154,171 | 5/1979 | Garnier | 254/400 X |
| 4,301,995 | 11/1981 | Niskin | 254/411 |
| 4,347,680 | 9/1982 | Kaestner | 254/397 X |
| 4,417,718 | 11/1983 | Niskin | 254/394 |
| 4,492,363 | 1/1985 | Niskin | 254/394 |

FOREIGN PATENT DOCUMENTS

| 991668 | 10/1951 | France | 254/394 |
| 226991 | 5/1943 | Switzerland | 254/393 |
| 275408 | 8/1927 | United Kingdom | 254/400 |
| 802732 | 10/1958 | United Kingdom | 254/394 |

Primary Examiner—Stuart S. Levy
Assistant Examiner—Joseph J. Hail, III
Attorney, Agent, or Firm—William A. Newton

[57] ABSTRACT

Disclosed is a sheave assembly for supporting a downward extending cable wherein a plurality of rollers are disposed upward and outward in a staggered manner from a plane defined by a downward facing arcuate path along which the cable approximately passes and wherein each roller comprises a plurality of portions constructed, configured and dimensioned to conform to cables having different diameters and being composed of differing materials, if desired.

2 Claims, 5 Drawing Figures

MULTIPLE SHEAVE ASSEMBLY WITH ANGLED ROLLERS

BACKGROUND OF THE INVENTION

1. Field of the Invention

This invention relates to sheave assemblies having multiple pulleys or rollers used for such activities as lowering wire cables to which sensors and instruments are attached, as in hydrographic work from ships where a freely suspended sheave assembly is required.

2. Description of Prior Art

For the above described purpose, the prior art discloses a counter-balanced sheave assembly for supporting a cable having a tension applied thereto comprising a plurality of pulleys (rollers) rotatably mounted along a downwardly facing, arcuate path with each roller having its axis of rotation being substantially perpendicular to a plane containing the arcuate path. Consequently, the force of the cable extending over each roller is directed downward in a direction substantially perpendicular to the pivotal axis of the roller as shown in the prior art sheave assembly of FIG. 1. Examples of such multiple-pulley sheave assemblies are shown in U.S. Pat. Nos. 4,492,363 to Niskin; 4,417,718 to Niskin; and pending U.S. application Ser. No. 824,243 to Niskin et al. now U.S. Pat. No. 4,690,380.

Referring to FIG. 1, shown therein is one of a plurality of prior art rollers 10 having a cable 12. The roller 10 is mounted in a support frame 14 having extension portions 16 extending above the roller on each side of the cable to feed the cable 12 into a groove 18 of the roller 10 and to maintain the cable within the groove. In this manner, the extension portions 16 act as a funnel.

There are situations wherein the prior art sheaves have certain drawbacks. First, for example, there are streamer cables which have portions of varying diameters composed of different materials. These streamers include a small diameter steel cable portion, a PVC plastic cable portion of larger diameter filled with oil, and yet a larger diameter steel housing or module cable portion that can be used for coupling or for instruments. For example, this steel housing could have a four inch diameter. Applicant was faced with two problems when designing a sheave assembly for this type of cable. First, applicant had to design a sheave of reasonable size to accomodate a large diameter cable and also a sheave that could accomodate a cable having portions with substantially varying diameters.

The applicant considered enlarging the rollers and extension portion 16 of FIG. 1 to correspondingly receive the largest cable diameter. First, as a minimum, the groove of the roller must extend up to the equator of the cable and the roller must have a sufficient diameter at the center of the groove to provide structural strength. Consequenty, for a four inch diameter sheave assembly, the groove would have to be a minimum of 2.25 inches and the roller would have to have at least a 5.5 inch diameter. Since the cable must not have more than a three degree bend around each roller, the sheave assembly requires a large number of rollers. Consequently, the use of rollers with a 5.5 inch diameter would create an enormous sheave assembly, which would have a diameter, for example, extended from an initial 9 feet to 15 feet. This size diameter is highly undesirable in its intended environment.

In the above design, there is a second drawback. With the groove of the roller only extending to the equator of the cable, the depth of the groove in the roller is reduced to allow for smaller rollers. Consequently, the extension portions 16 must take the place of reduced walls of the groove. This leads to a second problem of the cable rubbing against the extension portions 16 which are fixed and do not rotate with the rollers. If this problem is eliminated by extending the walls of the groove upward as in the prior art (shown in FIG. 1), then this makes the size of the rollers and therefore the sheave assembly even larger, e.g. 9 feet diameter increased to something in excess of 20 feet diameter.

Additionally, if instead of extending the grooves upward, the extension portions were spaced apart by a greater distance, then the cable would not be reliably fed into the groove of the roller, particularly for a small wire cable.

Consequently, applicant was faced with what appeared to be an insolvable problem, how to have an acceptable size sheave assembly using prior art designs. Additionally, there was a second problem of accomodating cables of substantially varying diameters.

INCORPORATION BY REFERENCE

U.S. Pat. Nos. 4,492,363; 4,301,995; and 4,417,718 are incorporated herein.

SUMMARY OF INVENTION

The present invention is directed toward a sheave assembly for supporting a cable wherein a plurality of rollers are disposed upward and outward from a plane defined by a downward facing arcuate path along which the cable approximately passes.

In the preferred embodiment, each of the angled rollers has a plurality of curved-shaped portions dimensioned and configured to conform to different diameters of the same cable or different cables. Additionally, each portion of the roller can be composed of a suitable material for the cable having a diameter causing engagement of that particular portion. Hence, when desirable, each roller can be composed of a plurality of portions having different concave dimensions and being composed of different materials.

By virtue of the present invention, applicant has found a way to accomodate very large size cables while maintaining the sheave assembly at a reasonable size by eliminating the need for large rollers, and therefore a large sheave assembly, as taught by the prior art, and substituting therefor a greater number of angled and oppositely positioned rollers.

Additionally, the present invention can accomodate cables with substantially varying diameters or a single cable with portions having substantially varying diameters.

BRIEF DESCRIPTION OF THE DRAWINGS

Further objects and advantages of the present invention will become apparent as the following description proceeds, taken in conjunction with the accompanying drawings in which.

DESCRIPTION OF THE PREFERRED EMBODIMENT

Figure 1:
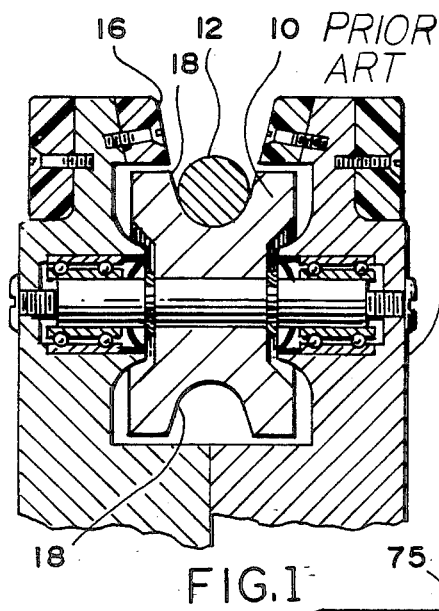
FIG. 1 is a fragmented cross-sectional view of the multiple pulley assembly of the prior art.
Figure 5:
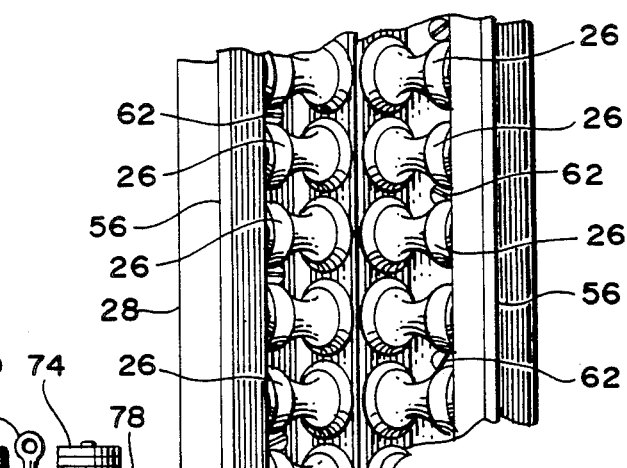
Figure 2:
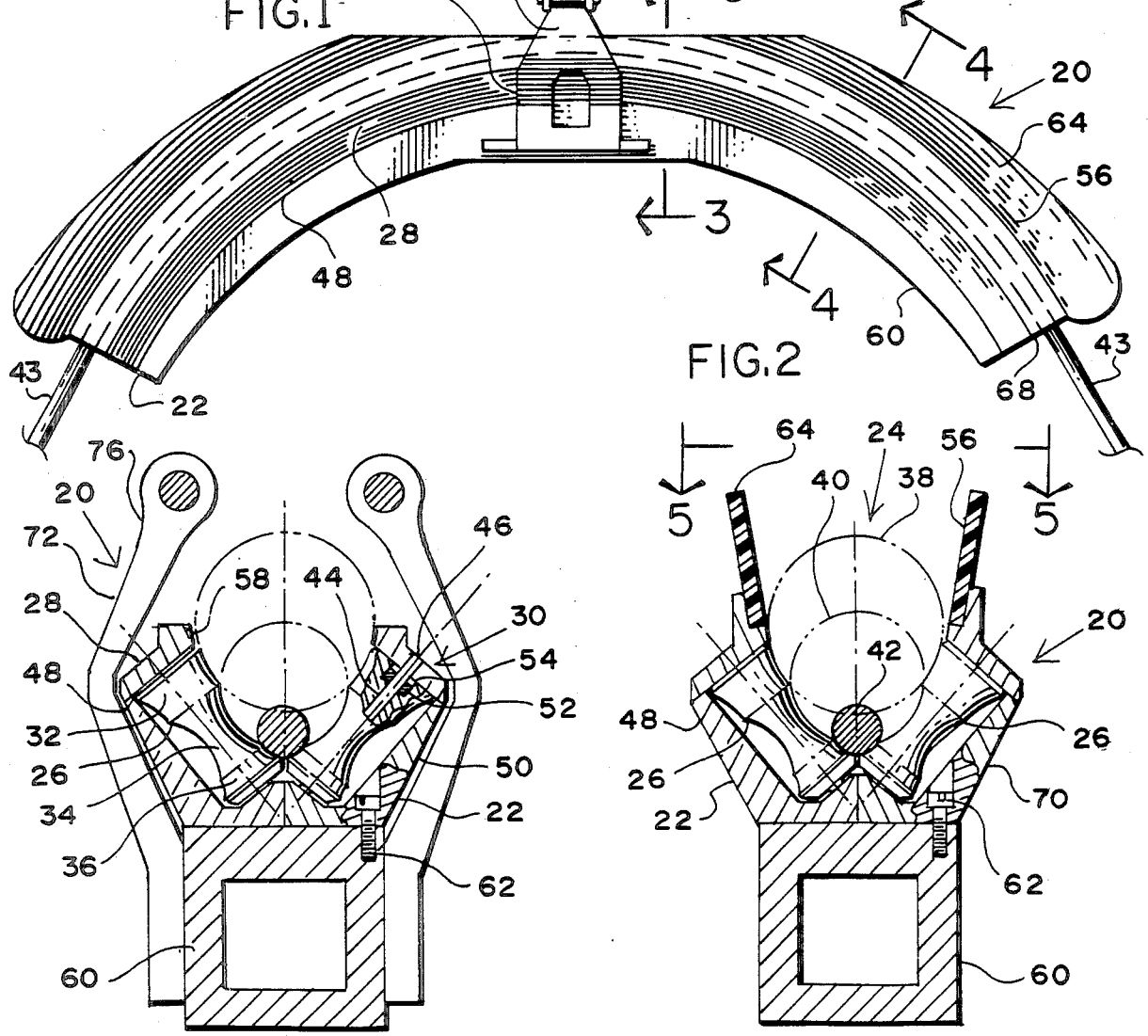
FIG. 2 is a side view of the multiple pulley assembly of the present invention.
Figure 3:
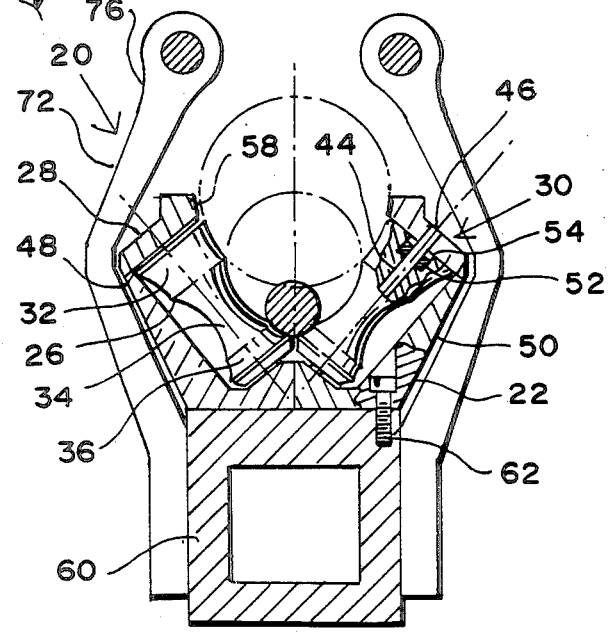
FIG. 3 is a cross-sectional view of the multiple pulley assembly of the present invention taken along section line 3—3 in FIG. 1.
Figure 4:
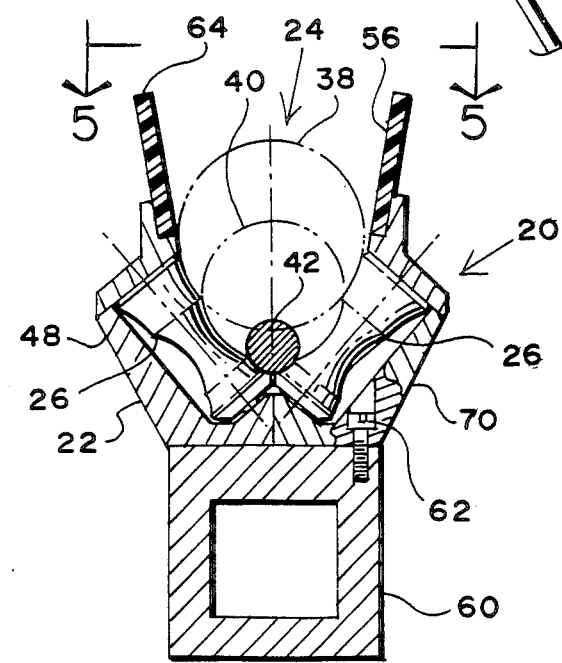
FIG. 4 is a cross-sectional view of the multiple pulley assembly of the present invention taken along section line 4—4 in FIG. 1.

As shown in the FIGURES, there is disclosed a sheave assembly 20 constructed in accordance with the present invention. The assembly 20 includes an arched support frame 22 defining an upwardly facing trough 24, which preferably, but not necessarily, comprises a portion of a circle, e.g. 120 degree arc with a radius of 54 inches.

Mounted inside the trough 24 is a plurality of rollers or pulleys 26 and 27. With respect to the cross-sectional view of the trough 24, rollers 26 and 27 are arranged in a novel manner at an angle on opposed sides 28 and 30, respectively, of the support frame 22 so that the pivotal axes of the rollers form a V-shape when viewed along a downward facing arcuate path in which the rollers are arranged along the longitudinal dimensions of the support frame 22. In the preferred embodiment, there are pairs of rollers 26 and 27 directly opposed to each other so that these pivotal axes actually intersect to define the V-shape. In an alternative implementation of the sheave assembly 20, the rollers 26 and 27 are staggered, i.e. one on one side and then one on the other side, along the arcuate path. This staggered relationship allows for a reduction of the angular bend on the cable. In the illustrated implementation, the angle of the pivotal axes of the rollers 26 are, for example, 50 degrees from the horizontal.

In the preferred embodiment, each roller 26 or 27 is designed to have a plurality of curved portions configured and dimensioned to conform to and receive a corresponding number of cables of different diameters. Hence, each pulley has a cross section comprising a plurality of different diameter circular peripheries. However, it should be appreciated that one of the broad aspects of this invention would include a plurality of different shaped rollers 26 and 27. For instance, although less desirable, a flat shaped roller (cylinder) without a plurality of portions and without curvature would also come within the scope of the invention. Consequently, a variety of shapes can be used for the broad invention, as suited to the particular need.

For the purposes of receiving the streamer described in the Description of the Prior Art, each roller 26 or 27 is configured so as to have concave portions 32, 34 and 36 with increasing degrees of curvature to receive cables of decreasing diameters as shown by circles 38, 40 and 42 shown in the drawings and representing cable portions of diameters of a cable 43. For receiving the steel cable 42 having a 1.25 inch diameter, the lower end roller portion 36 preferably, but not necessarily, is made of steel. For receiving the plastic oil-filled cable portion 40, having a 3.5 inch diameter, the center roller portion 34, preferably, but not necessarily, is made of plastic, e.g. Nylatron. For receiving the steel housing 34 having a 4.87 inch diameter, the upper end roller portion 32 preferably, but not necessarily, is made of steel. Although rollers of any suitable shape and composition comprises applicant's novel invention, further novelty exists in dividing up the rollers into portions conforming in shape and composition to receive cables of differing diameters and composition.

Each roller 26 or 27 is mounted on a steel shaft 44 defining the previously described pivotal axis. Each shaft 44 is held in fixed, non-rotating dispositions by a key slot 46 at each end which engages a correspondingly configured aperture in one of a pair of sidewall portions 48 and 50. Each roller 26 or 27 is rotatably mounted on the shaft 44 by a ball bearing race 52 at each end of the roller. At each end of the roller, a rubber water seal 54 is positioned between the roller and the opposed sidewall portion 48 or 50 in surround relationship to the shaft 44.

The parts of the sidewall portions 48 and 50 extending above the upper ends of the rollers 26 or 27 define extension portions 56 and 58. They provide for the previously described "funneling" of the cable portion 38, 40, or 42 into the appropriate grooves 32, 34 or 36. For illustrative value, the extension portions 56 and 58 are shown tilting outward at angles of about 10 degrees from the vertical.

Typically, the two sidewall portions 48 and 50 are mirror images of each other. The support frame 22 has a box bridge 60 to which the sidewall portions are securely fastened via bolts 62. Most of the extension portions 56 and 58 comprise cable guards 64 and 66, respectively, secured by nuts and bolts to a pair of frames 68 and 70, respectively.

The rest of the structure of the sheave assembly 20 is per se not part of the invention and is discussed in the incorporated U.S. Pat. Nos. 4,492,363; 4,417,718; and 4,301,955. As discussed in detail therein, suspension means 74 is included with the sheave assembly 20 to allow for the suspension of the same and pivotal motion about two axes. Preferably, but not necessarily, counterbalanced means 74 can be included as described in the incorporated patents. The suspension means 72 will not be discussed herein other than to indicate it includes mounting arms 76, a swivel shaft 78 allowing rotation in one direction and a rotatably mounted eyebolt 80 which allows rotation in a direction perpendicular to that of the swivel shaft 78.

As with the designs of the incorporated patents in normal use of the sheave assembly 20, it is suspended by the eyebolt 80 so that the cable 43, being payed over the plurality of rollers 26 and 27, is above ground or platform level and extends downwardly from either end of the elevated support frame 22. The frame 22 can swing in a horizontal plane about the axis of rotation of the eyebolt 80 and in a vertical plane about the axis of rotation of the swivel shaft 78; thereby automatically maintaining the cable 43 in the plane of the arcuate path. As a result, the cable 43 will be positioned in the grooves of the sheave 26 and 27.

The downward facing arcuate path, curving along the longitudinal dimensions of the sheave assembly 20 and having the rollers disposed therealong on opposite sides thereof, comprises preferably, but not necessarily, a portion of a circle. The arcuate path defines a plane in which the rollers lie on either side thereof in staggered or opposed relationship, depending upon the implementation.

In either case, each roller is angled so as to extend upward and outward from the plane so as to form a trough with mostly decreasing dimensions to receive the cable. The cable is positioned in this trough approximately along at least part of this arcuate path, depending upon the angle of the cable extending from the sheave assembly 20. Substantially half of the rollers are on each side of the plane.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

I claim:

1. In a sheave assembly for supporting a cable having a tension applied thereto and which extends downward from said sheave assembly, said sheave assembly having a support frame and a plurality of rollers rotatably mounted to said support frame along a downwardly facing, arcuate path, the improvement comprising:

said rollers being positioned on opposed sides of a plane formed by said arcuate path, there being at least three said rollers on each of said opposed sides of said plane;

said rollers having their rotation axes disposed at an angle with respect to both said plane defined by said arcuate path and a line perpendicular to said plane so that each of said rotational axes of said rollers extends upward and outward with respect to said plane;

substantially one-half of said rollers being disposed on one side of said plane and substantially one-half of said rollers being disposed on the other side of said plane; and each of said rollers having a plurality of curved-shaped portions of different concave curvatures dimensioned and configured to conform to cables having different diameters.

2. In the sheave assembly of claim 1, wherein said plurality of curved-shaped portions are composed of different materials, each said different material being of a type selected for the cable engaging a particular one of said portions.

* * * * *